US007127434B2

(12) United States Patent
Burningham

(10) Patent No.: US 7,127,434 B2
(45) Date of Patent: Oct. 24, 2006

(54) APPARATUS, SYSTEM, AND METHOD FOR POSTAGE STAMP GENERATING

(76) Inventor: Leonard W. Burningham, 1227 E. Gilmer Dr., Salt Lake City, UT (US) 84105

( * ) Notice: Subject to any disclaimer, the term of this patent is extended or adjusted under 35 U.S.C. 154(b) by 0 days.

(21) Appl. No.: 10/680,925

(22) Filed: Oct. 8, 2003

(65) Prior Publication Data

US 2005/0080751 A1 Apr. 14, 2005

(51) Int. Cl.
*G06F 17/00* (2006.01)

(52) U.S. Cl. ...................... 705/401; 705/408; 705/410; 705/405; 705/62; 705/60; 283/71

(58) Field of Classification Search .................. 101/71; 283/71; 705/401, 408, 410, 405, 62, 60
See application file for complete search history.

(56) References Cited

U.S. PATENT DOCUMENTS

| | | | | |
|---|---|---|---|---|
| 4,715,622 A * | 12/1987 | Mikhail | 283/71 |
| 5,319,562 A | 6/1994 | Whitehouse | 364/464.03 |
| 5,343,386 A * | 8/1994 | Barber | 700/90 |
| 5,423,573 A * | 6/1995 | de Passille | 283/71 |
| 5,819,240 A | 10/1998 | Kara | 705/408 |
| 5,873,605 A * | 2/1999 | Kaplan | 283/71 |
| 5,923,406 A * | 7/1999 | Brasington et al. | 355/40 |
| 6,244,763 B1 | 6/2001 | Miller | 400/76 |
| 6,297,891 B1 | 10/2001 | Kara | 358/405 |
| D451,952 S | 12/2001 | Kara et al. | D19/3 |
| D456,838 S | 5/2002 | Kara et al. | D19/3 |
| 6,385,731 B1 | 5/2002 | Ananda | 713/202 |
| 6,428,219 B1 | 8/2002 | Stier et al. | 400/76 |
| 6,450,537 B1 * | 9/2002 | Norris | 283/71 |
| 6,461,063 B1 | 10/2002 | Miller et al. | 400/76 |
| 6,503,329 B1 * | 1/2003 | Patton et al. | 118/669 |
| 6,671,813 B1 | 12/2003 | Ananda | 713/202 |
| 6,692,033 B1 | 2/2004 | Miller et al. | 283/116 |
| 6,868,406 B1 | 3/2005 | Ogg et al. | 705/60 |
| 6,889,214 B1 | 5/2005 | Pagel et al. | 705/410 |
| 6,931,549 B1 | 8/2005 | Ananda | 713/201 |
| 6,934,839 B1 | 8/2005 | Pagel | 713/156 |
| 6,939,062 B1 | 9/2005 | Ogg et al. | 400/62 |

(Continued)

FOREIGN PATENT DOCUMENTS

EP 0893787 1/1999

(Continued)

OTHER PUBLICATIONS

Canada Newswire: "Can you picture it? Canada Post presents Picture Postage"; Apr. 28, 200.*

(Continued)

*Primary Examiner*—John W. Hayes
*Assistant Examiner*—Shannon Saliard
(74) *Attorney, Agent, or Firm*—Kunzler & Associates

(57) ABSTRACT

Disclosed is an apparatus, system, and method for postage stamp generation. The apparatus includes print module configured to print a customized image or text based stamp, and a communication module for receiving verification from a server. The apparatus may include a creation module for creating an image or text based stamp, and a selection module for selecting a stamp from a pre-approved selection of stamps. In one embodiment, the apparatus may comprise a personal computer configured for postage stamp generation. Alternatively, the apparatus may include handheld electronic devices, notebooks, or the like. The system may comprise the apparatus, a verification server, and a printer operatively coupled to the apparatus. The method comprises selecting or creating a stamp, sending the stamp to the server for verification, receiving verification, previewing the stamp, purchasing the stamp, and printing the stamp.

18 Claims, 3 Drawing Sheets

U.S. PATENT DOCUMENTS

| | | | | |
|---|---|---|---|---|
| 2002/0033598 | A1* | 3/2002 | Beasley | 283/71 |
| 2002/0046195 | A1* | 4/2002 | Martin et al. | 705/401 |
| 2002/0056988 | A1* | 5/2002 | Patton | 283/71 |
| 2002/0093568 | A1* | 7/2002 | Chumbley | 348/207 |
| 2002/0149195 | A1* | 10/2002 | Beasley | 283/71 |
| 2003/0140017 | A1* | 7/2003 | Patton et al. | 705/410 |
| 2004/0254808 | A1 | 12/2004 | Bennett et al. | 705/1 |
| 2004/0254898 | A1* | 12/2004 | Parker et al. | 705/402 |
| 2005/0071296 | A1* | 3/2005 | Lepkofker | 705/410 |
| 2005/0071297 | A1 | 3/2005 | Kara | 705/410 |
| 2005/0075990 | A1 | 4/2005 | Ogg | 705/406 |
| 2005/0075991 | A1 | 4/2005 | Ogg | 705/408 |

FOREIGN PATENT DOCUMENTS

| | | | | |
|---|---|---|---|---|
| EP | 0893787 | A2 | * | 1/1999 |
| EP | 1007435 | | | 2/2001 |
| EP | 1077435 | A1 | * | 2/2001 |
| JP | 11-249205 | A | * | 9/1999 |
| JP | 411249205 | | | 9/1999 |
| JP | 200109380 | | | 10/1999 |
| JP | 2000-343900 | A | * | 12/2000 |
| JP | 020003434900 | | | 12/2000 |
| JP | 2001-109380 | A | * | 4/2001 |
| JP | 2001-118003 | A | * | 4/2001 |
| JP | 02001118003 | | | 4/2001 |
| WO | WO 99/60551 | | | 11/1999 |
| WO | WO 99/60551 | A1 | * | 11/1999 |
| WO | WO 00/24590 | | | 5/2000 |
| WO | WO 00/24590 | A1 | * | 5/2000 |

OTHER PUBLICATIONS

Peppriell: “The Post Office Unveils the E-stamp”; Searcher, May 1999, vol. 7, No. 5.*

Tygar et al: “Cryptographic Postage Indicia”; Jan. 6, 1998; citeseer. ni.nec.com/update/93604.*

Komblum: “Postal Service OKs E-stamp”; Mar. 31, 1998, news. com/2100-1023-209714.htm.*

“Send a Christina Olsen E-postal Card”; christinaolsen.com/card. html.*

“Can you picture it? Canada post presents picture postage”, Canada Newswire, Apr. 28, 2000.

* cited by examiner

APPARATUS, SYSTEM, AND METHOD FOR POSTAGE STAMP GENERATING

BACKGROUND OF THE INVENTION

1. Field of the Invention

This invention relates to postage stamp generation and more particularly relates to systems and methods for remotely selecting or creating customized postage stamps.

2. Description of the Related Art

For over 150 years postage stamps have been the primary currency of the United States Postal Service. Little has changed the way in which letters are sent and received in the United States. In the 1920's metered mail was introduced for businesses. For the next seventy years there was little innovation for the stamp. However, in the late 1990's the United States Postal Service approved the first "e-stamp" or electronic stamp that enabled a user to purchase postage over the internet.

The electronic stamp appears very similar to a metered stamp, and is generally nothing more than an encrypted barcode. While this may be suitable for the business customer, individual customers desire to personalize letters and envelopes and for this reason the United States Postal Service offers a wide range of image based stamps.

However, despite the large selection of stamps available today, it has been found that there is a larger demand for variety. For example, businesses desire to use their logo as postage, and individuals would like to use their own images on a stamp. Therefore, there is a need for an apparatus, system, and/or method that enables a customer to create a customized stamp that employs a personal image, special text, or company logo. Additionally, there is a need for the apparatus, system and/or method to validate the customized stamp as a proper legal tender for the United States Postal Service.

BRIEF SUMMARY OF THE INVENTION

The present invention has been developed in response to the present state of the art, and in particular, in response to the problems and needs in the art that have not yet been fully solved by currently available customizable postage stamp systems. Accordingly, the present invention has been developed to provide a process, apparatus, and system for postage stamp generation that overcomes many or all of the above-discussed shortcomings in the art.

A postage stamp generation apparatus is provided. The apparatus may comprise a print module configured to print a text or image based stamp, and a communication module configured to receive verification from a server. In one embodiment the postage stamp generation apparatus may also include a creation module configured to create a text or image based stamp. Furthermore, the apparatus may comprise a plurality of pre-approved stamps stored within the postage stamp generation apparatus. In one embodiment, the plurality of pre-approved stamps are contained within a database. Alternatively, the plurality of pre-approved stamps may be located on a remote server.

The postage stamp generation apparatus may comprise a selection module configured to select a text or image based stamp from the plurality of pre-approved stamps. A preview module is provided to preview a stamp generation request. Also, a print module is provided to finalize and format the stamp generation request for a printer. In one embodiment, the postage stamp generation apparatus further comprises a purchase module configured to accept payment information for the stamp generation request, and the printer coupled to the print module and configured to print the stamp generation request.

The present invention may also include a server for validating stamp generation requests. In one embodiment, the server comprises a database coupled to the server, comprising a pre-approved selection of postage stamps, and a verification module configured to verify stamp generation requests. Additionally, the server may include communication module configured to receive stamp generation requests and send validations of the request. Operatively coupled to the server is a validation module configured to communicate with the database in order to validate the stamp generation request.

In one embodiment, the present invention comprises a computer readable storage medium comprising computer readable code configured to carry out a method for stamp generation. The method may comprise identifying a text or image based stamp to be printed, communicating the stamp with a server for verification, verifying that the stamp may be used as legal postal tender, previewing the stamp before purchasing the stamp, purchasing the stamp, and printing the stamp.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
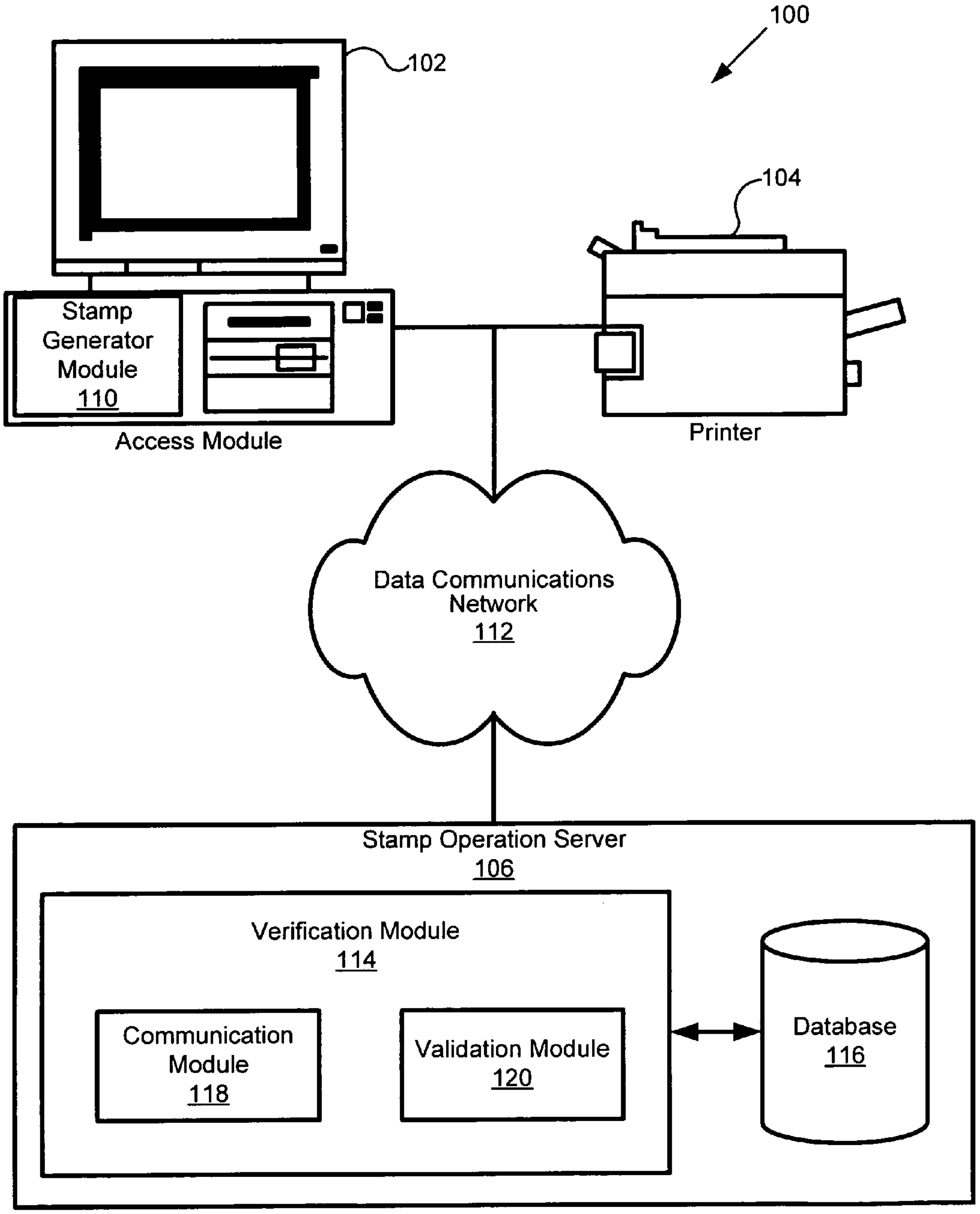
FIG. 1 is a schematic block diagram illustrating one embodiment of a postage stamp generation system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a postage generation system 100 of the present invention. The postage generation system 100 may comprise user access device or an access module 102, a printer 104, a stamp operation server 106 (herein referred to as a "server"), and a data communication network or communications channel 112. In one embodiment, the access module 102 maybe a desktop computer or server configured with a stamp generator module 110. Alternatively, the access module 102 may comprise a personal digital assistant (PDA) mobile phone, or any electronic device wherein the access module 102 may be configured to operate. The stamp generator module 110 may be configured to likewise operate within portable computers such as notebooks and handheld devices. In a further embodiment, the access module 102 may be configured to communicate with a printer 104 over the communications channel 112. The communications channel 112 is preferably a local area network (LAN). Alternatively, the communications channel 112 may comprise a wide area network (WAN), a wireless local area network (WLAN), or a direct connection such as universal serial bus (USB), IEEE 1394 (FIREWIRE® (registered by Apple Computer, Inc. of Cupertino, Calif.)), or the like.

The access module 102 may communicate with the server 106 over the communications channel 112. In one embodiment, the communications channel 112 may comprise the Internet. In a further embodiment, the server 106 and the access module 102 may be configured to operate within the same local area network. The server 106 may comprise a verification module 114 and a database 116. The verification module 114 may be configured with a communication module 118 and a validation module 120. The communication module 118 may comprise a network interface card that is well known in the art and does not require further explanation herein.

In one embodiment, the stamp generator module 110 may communicate a stamp generation request with the verification module 114. The communication module 118 receives the request and the validation module 120 validates the request. Validating the request may be one advantage of the present invention. The present invention enables a customer to create customized postage stamp or individually selected postage stamp. As defined herein, customized postage may comprise any image, text, numbers, or combination thereof as selected or created by a user. However, it would not be beneficial to allow a customer to create and use postage that resembles the trademarked or copyrighted logo of another company. For example, without the validation module 120 a user would be able to create postage that resembles the COCA-COLA® (registered to Coca-Cola Company of Atlanta, Ga.) logo. The validation module 120 validates the stamp generation request by accessing the database 116. This process will be discussed in greater detail with reference to FIG. 3.

Figure 2:
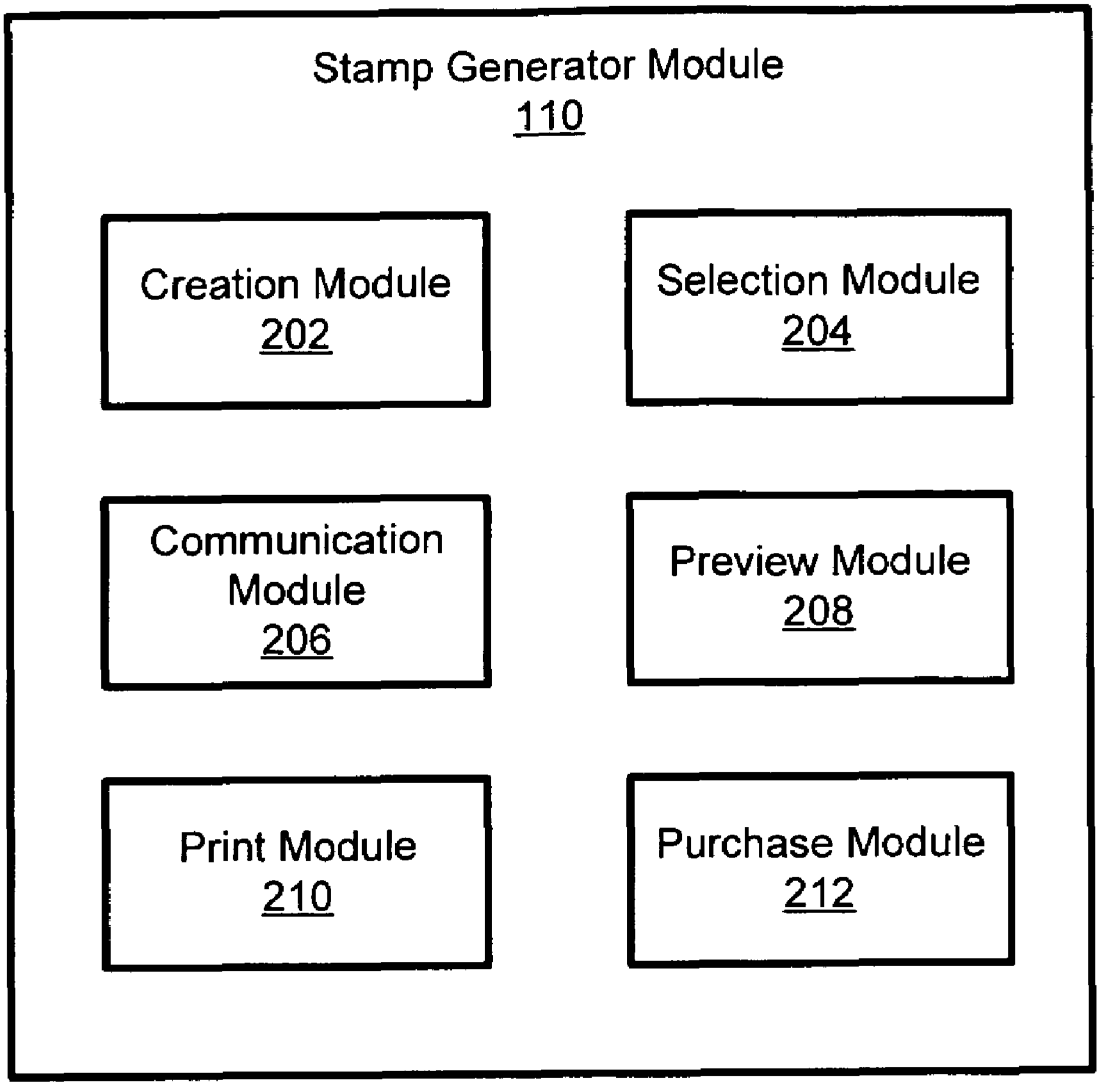
FIG. 2 is a schematic block diagram illustrating one embodiment of a postage stamp generation apparatus in accordance with the present invention.

FIG. 2 is a schematic block diagram illustrating one embodiment of a stamp generator module 110. In the illustrated embodiment, the stamp generator module 110 may comprise a creation module 202, a selection module 204, a communication module 206, a preview module 208, a print module 210, and a purchase module 212. The creation module 202 may be configured to enable a user to draw or write a customized stamp. It is also contemplated to design the creation module 202 to interface with drawing and image manipulation programs such as PHOTOSHOP® or ILLUSTRATOR® (both registered to Adobe Systems Incorporated of San Jose, Calif.) or PHOTOSUITE® (registered to Roxio, Inc. of Santa Clara, Calif.). For example, the creation module 202 may be activated from the drawing or illustrating program as an export option. Alternatively, the creation module 202 may comprise an image manipulation program configured for creating image or text based stamps.

If a user or access module does not want to design their own image, text or use their company logo, it is contemplated to let a user select a stamp from a pre-approved selection of stamps. The selection module 204 may be configured to allow the user to select from the pre-approved stamps. In one embodiment, the stamp generator module 110 may access the database 116 and download a selection of pre-approved stamps. Alternatively, the stamp generator module 110 may comprise a local database (not shown) configured to store a selection of pre-approved stamps. Once a stamp is created or selected, the communication module 206 may communicate with the server 106 over communication channels 112. As described above with reference to the communication module 118, the stamp generator communication module 206 may comprise a network interface card.

In another embodiment, the preview module 208 may be configured to preview the stamp before printing. Once approved by the user, the print module 210 is configured to prepare the stamp for printing. Alternatively, the print module 210 may be operatively coupled to the printer 104 and configured to receive stamp generation requests from the access module 102. In a further embodiment, the purchase module 212 may be provided and configured to accept payment information from the user and transmit the information to the server 106. It is also contemplated to allow payment information to include credit card information. Alternatively, the payment information may comprise account information for automatic billing.

Figure 3:
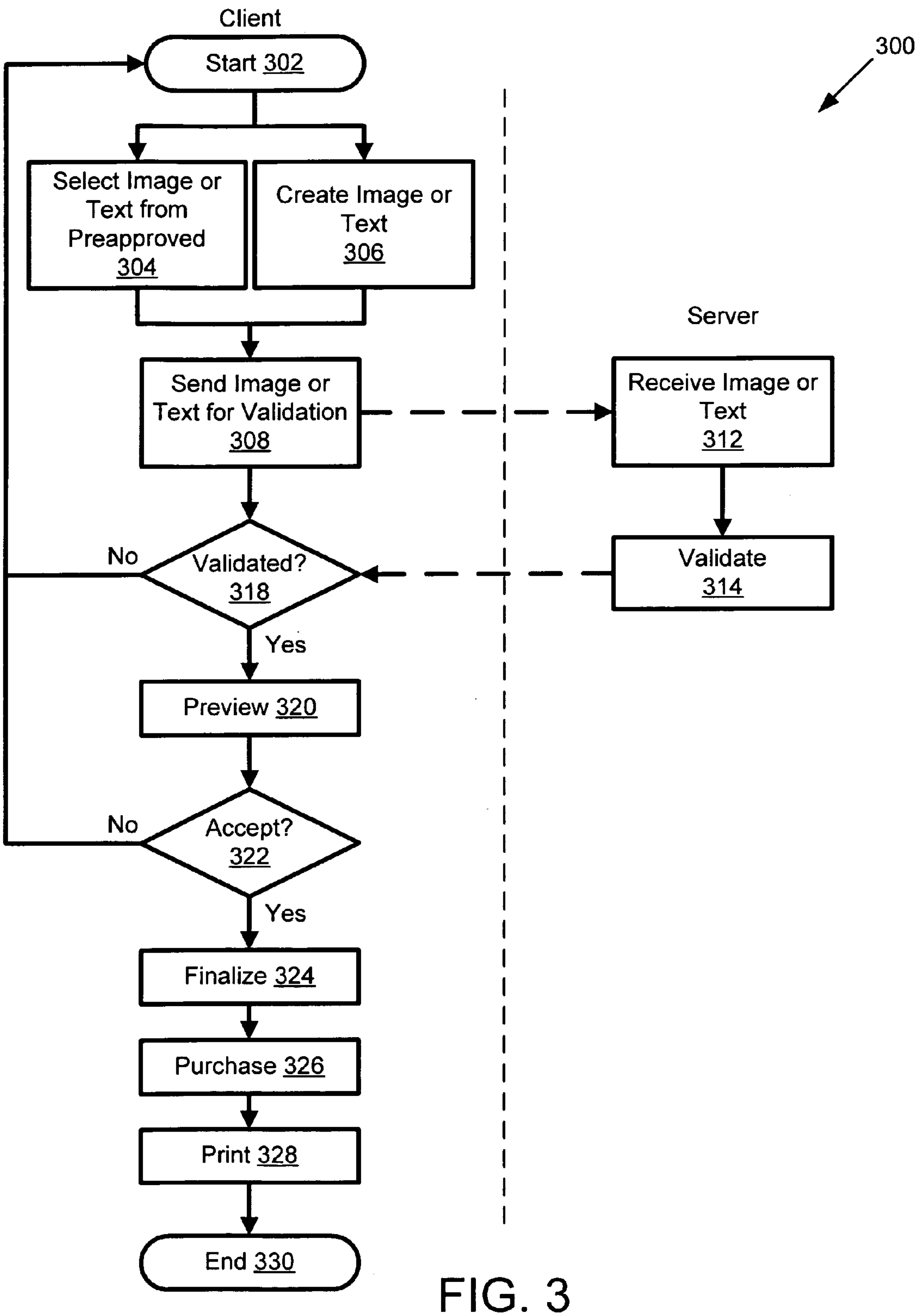
FIG. 3 is a schematic flow chart diagram illustrating one embodiment of a method for postage stamp generation accordance with the present invention.

FIG. 3 is a schematic flow chart diagram illustrating one embodiment of a method 300 for stamp generation of the present invention. The method 300 starts 302 and a user selects 304 an image or text from a selection of pre-approved stamps. Alternatively, the user may create 306 the image or text based stamp using the creation module 202 of FIG. 2. Once the image is selected 304 or created 306, the communication module 206 sends 308 the image or text for validation over the communication channel 112. The communication module 118 of the server 106 receives 312 the stamp and the validation module 120 validates 314 the stamp. In one embodiment, the validation module 120 validates 314 the stamp by accessing the database 116 and comparing the stamp to the stamps stored in the database 116. Furthermore, the validation module 120 may be configured to authorize the user to use a corporate, trademarked, or copyrighted logo.

Once validated 314, the server 106 communicates the validation to the access module 102, and the scaling module 120 determines 318 whether the stamp was validated or not. If not, the method 300 starts 302 again. If validated 318, the stamp may then previewed 320 and the user may accept 322 the stamp. If the user does not accept the stamp, then the method 300 may start 302 again. In one embodiment, the accepted stamp may then be finalized 324 by the print module 210 and the user then purchases 326 the stamp as discussed above. The communication module 206 may then transmit the stamp to the printer 104 for printing 328 and the method 300 ends 330.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A postage stamp generation apparatus, comprising:

a processor configured to execute executable data structures; and a memory device connected to the processor for storing the executable data structures and associated operational data structures, the executable and operational data structures comprising:

a creation module configured to create a customized stamp in response to user input provided through an input device in communication with the processor, the customized stamp comprising at least one of text and images;

a print module configured to print a selected stamp on a printer device in communication with the processor, the selected stamp designated by data of the operational data structures stored in the memory device, the selected stamp comprising one of the customized stamp and a pre-approved stamp; and a communication module configured to receive authorization from a remote server through a communication device to authorize the print module to print the selected stamp in response to stamp generation requests, wherein the authorization depends on validation of the customized stamp through an automatic comparison of the customized stamp and a database.

2. The postage stamp generation apparatus of claim 1, the executable and operational data structures further comprising:

a selection module configured to present a plurality of pre-approved stamps on an output device for selection by a user, the output device in communication with the processor.

3. The postage stamp generation apparatus of claim 2, wherein the plurality of pre-approved stamps are stored on the memory device.

4. The postage stamp generation apparatus of claim 2, wherein the plurality of pre-approved stamps are stored on the remote server.

5. The postage stamp generation apparatus of claim 1, the executable and operational data structures further comprising:

a preview module to enable the user to preview the selected stamp on an output device in communication with the processor; and a purchase module to accept payment information from the user by way of the input device and enable the user to purchase the selected stamp.

6. A postage stamp generation system, comprising:

a postage stamp generation apparatus, comprising:

a processor configured to execute executable data structures; and a memory device connected to the processor for storing the executable data structures and associated operational data structures, the executable and operational data structures comprising:

a creation module configured to create a customized stamp in response to user input provided through an input device in communication with the processor, the customized stamp comprising at least one of text and images;

a print module configured to print a selected stamp on a printer device in communication with the processor, the selected stamp designated by data of the operational data structures stored in the memory device, the selected stamp comprising one of the customized stamp and a pre-approved stamp; and a communication module configured to receive authorization from a server through a communication device to authorize the print module to print the selected stamp;

a database storing stamp data relating to at least one of authorized stamps and unauthorized stamps; and the server configured to receive stamp generation requests from the postage stamp generation apparatus and to validate the availability of the customized stamp by comparing the customized stamp with the stamp data in the database.

7. The postage stamp generation system of claim 6, the server further comprising:

a validation module configured to validate the stamp generation requests; and a server communication module configured to communicate the validation to the postage stamp generation apparatus.

8. A postage stamp generation system, comprising:

a stamp generation apparatus configured to generate a selected postage stamp designated by user input provided through an input device in communication with the stamp generation apparatus;

a server in communication with the stamp generation apparatus by way of a communication device, wherein the server is configured to automatically validate that a user has authorization to use the selected postage stamp, wherein the authorization depends on validation of the selected postage stamp through an automatic comparison of the selected postage stamp and a database staring stamp data corresponding to at least one of authorized stamps and unauthorized stamps, the server further configured to receive stamp generation requests describing the selected postage stamp from the stamp generation apparatus; and a data communication network enabling communication between the server and the stamp generation apparatus.

9. The postage stamp generation system of claim 8, wherein the stamp generation apparatus further comprises a creation module configured to enable the user to create a customized stamp in response to user input provided through an input device in communication with the stamp generation apparatus, the customized stamp comprising at least one of text and images.

10. The postage stamp generation system of claim 8, wherein the server further comprises a verification module in communication with the database, the verification module configured to verify the user's authority to use a selected stamp by comparing the selected stamp with the stamp data.

11. The postage stamp generation system of claim 8, wherein the stamp generation apparatus further comprises a memory device storing a plurality of pre-approved stamps.

12. The postage stamp generation system of claim 11, wherein the memory device further stores:

a selection module configured to present a stamp from the plurality of pre-approved stamps on an output device for selection by a user, the output device in communication with the stamp generation apparatus;

a communication module configured to receive verification from the server, a preview module configured to enable the user to preview the selected stamp on the output device;

a print module configured to print the selected stamp on a printer device; and a purchase module configured to accept payment information from the user and enable the user to purchase the selected stamp.

13. The postage stamp generation system of claim 10, wherein the verification module further comprises:

a server communication module configured to receive a stamp generation request from the stamp generation apparatus and communicate a validation of the stamp generation request to the stamp generation apparatus; and a validation module in operable communication with the database to validate the stamp generation request.

14. A computer program product in a computer system, said computer program product comprising a plurality of computer executable instructions recorded on a computer-readable media, wherein said instructions, when executed by the computer, cause the computer to perform operations for generating a postage stamp, the operations organized into a plurality of functional modules, the modules comprising:

a creation module configured to create a customized stamp in response to user input provided through an input device in communication with the computer, the customized stamp comprising at least one of text and images;

a print module configured to print a selected stamp on a printer device, the selected stamp being selected, based on user input, from at least one of the customized stamp and a pre-approved stamp; and a communication module configured to receive authorization from a remote server through a communication device to authorize printing of the selected stamp in response to stamp generation requests, wherein the authorization depends on validation of the customized stamp through an automatic comparison of the customized stamp and a database.

15. The computer program product of claim 14, the modules further comprising a selection module configured to present a user a plurality of pre-approved stamps on an output device for selection of the selected stamp by a user, the output device in communication with the computer.

16. The computer program product of claim 14, the modules further comprising:

a preview module configured to enable the user to preview the selected stamp on an output device in communication with the computer; and a purchase module configured to accept payment information from the user by way of the input device and enable the user to purchase the selected stamp.

17. A method for generating a customized stamp, the method comprising:

creating, at a user access device, customized stamp data comprising at least one of text and images;

communicating to a server the customized stamp data, by way of a communication device;

verifying, via the server, that the customized stamp data is usable as legal postal tender;

validating, via the server, the customized stamp data through an automatic comparison of the customized stamp data and a database; and generating, at the user access device and in response to verification and validation from the server, a customized stamp based on the customized stamp data.

18. The method of claim 17, wherein creating the customized stamp data further comprises at least one of: selecting pre-approved stamp data and selecting custom stamp data.

* * * * *